(12) United States Patent
Benderius et al.

(10) Patent No.: US 11,653,084 B2
(45) Date of Patent: May 16, 2023

(54) METHOD OF CONFIGURING A CAMERA

(71) Applicant: Axis AB, Lund (SE)

(72) Inventors: Björn Benderius, Lund (SE); Jimmie Jönsson, Lund (SE); Johan Jeppsson Karlin, Lund (SE); Niclas Svensson, Lund (SE)

(73) Assignee: Axis AB, Lund (SE)

( * ) Notice: Subject to any disclaimer, the term of this patent is extended or adjusted under 35 U.S.C. 154(b) by 115 days.

(21) Appl. No.: 17/463,392

(22) Filed: Aug. 31, 2021

(65) Prior Publication Data

US 2022/0109798 A1    Apr. 7, 2022

(30) Foreign Application Priority Data

Oct. 1, 2020   (EP) ..................................... 20199646

(51) Int. Cl.
| | |
|---|---|
| *H04N 23/617* | (2023.01) |
| *G06T 7/70* | (2017.01) |
| *G06V 20/40* | (2022.01) |
| *H04N 23/76* | (2023.01) |
| *H04N 23/61* | (2023.01) |
| *H04N 23/71* | (2023.01) |

(52) U.S. Cl.
CPC ............. *H04N 23/617* (2023.01); *G06T 7/70* (2017.01); *G06V 20/41* (2022.01); *H04N 23/61* (2023.01); *H04N 23/76* (2023.01); *G06T 2207/10016* (2013.01); *G06V 20/44* (2022.01); *H04N 23/71* (2023.01)

(58) Field of Classification Search
CPC ...... H04N 23/617; H04N 23/61; H04N 23/62; H04N 23/631; H04N 23/632; H04N 23/64; G06V 20/41; G06V 20/44
See application file for complete search history.

(56) References Cited

U.S. PATENT DOCUMENTS

| | | | |
|---|---|---|---|
| 6,301,440 B1 | 10/2001 | Bolle et al. | |
| 8,111,942 B2 * | 2/2012 | Farrer | G06V 40/16 |
| | | | 382/209 |

(Continued)

FOREIGN PATENT DOCUMENTS

| | | | | |
|---|---|---|---|---|
| CN | 107094231 A | * | 8/2017 | ......... H04N 5/23222 |
| KR | 20180026513 A | * | 3/2018 | |
| WO | 2019/007919 A1 | | 1/2019 | |

OTHER PUBLICATIONS

Extended European Search Report dated Feb. 16, 2021 for European Patent Application No. 20199646.9.

*Primary Examiner* — John Villecco
(74) *Attorney, Agent, or Firm* — Volpe Koenig

(57) ABSTRACT

A method of configuring a camera comprising: collecting a video data with the camera, providing a plurality of imaging profiles, each imaging profile being associated with a set of scene characteristics, for each imaging profile, generating a spatial output data in dependence on the video data and the set of scene characteristics of the imaging profile, wherein the spatial output data is indicative of spatial locations of events detected in the video data matching one or more of the scene characteristics, performing a comparison of the spatial output data of each of the plurality of imaging profiles, selecting a preferred imaging profile in dependence on the comparison, configuring the camera to operate according to the preferred imaging profile.

14 Claims, 8 Drawing Sheets

(56) References Cited

U.S. PATENT DOCUMENTS

| | | | | |
|---|---|---|---|---|
| 8,514,315 B2* | 8/2013 | Lee | ............... | H04N 23/611 |
| | | | | 348/222.1 |
| 8,587,652 B2* | 11/2013 | Iwanaga | ............... | G06V 20/52 |
| | | | | 382/103 |
| 8,890,959 B2* | 11/2014 | Carlsson | ............... | H04N 23/64 |
| | | | | 348/188 |
| 9,712,760 B2* | 7/2017 | Furuhashi | ............... | G06F 16/583 |
| 9,723,200 B2* | 8/2017 | Kanumuri | ............... | H04N 23/617 |
| 9,826,149 B2* | 11/2017 | Chalom | ............... | G06V 10/50 |
| 10,070,053 B2* | 9/2018 | Kannermark | ............... | H04N 5/144 |
| 11,050,924 B2* | 6/2021 | Visa | ............... | H04N 23/61 |
| 11,165,954 B1* | 11/2021 | Beach | ............... | H04N 23/65 |
| 11,284,012 B2* | 3/2022 | Citerin | ............... | H04N 23/90 |
| 11,288,101 B2* | 3/2022 | Citerin | ............... | H04N 23/73 |
| 11,399,136 B2* | 7/2022 | Veit | ............... | H04N 23/681 |
| 11,418,701 B2* | 8/2022 | Citerin | ............... | H04N 23/61 |
| 11,575,837 B2* | 2/2023 | Bendtson | ............... | H04N 7/18 |
| 2009/0073285 A1 | 3/2009 | Terashima | | |
| 2010/0208093 A1* | 8/2010 | Lee | ............... | H04N 23/667 |
| | | | | 348/222.1 |
| 2011/0242395 A1* | 10/2011 | Yamada | ............... | H04N 23/631 |
| | | | | 348/E5.025 |
| 2016/0277724 A1* | 9/2016 | Linåker | ............... | H04N 23/667 |
| 2017/0214850 A1* | 7/2017 | Kannermark | ............... | H04N 23/611 |
| 2019/0007678 A1* | 1/2019 | Perez-Ramirez | ............... | H04N 19/126 |
| 2019/0171897 A1* | 6/2019 | Merai | ............... | G06F 18/217 |
| 2019/0379832 A1 | 12/2019 | Topalli | | |
| 2021/0051273 A1* | 2/2021 | Zhang | ............... | H04N 23/695 |
| 2021/0350129 A1* | 11/2021 | Muhrbeck | ............... | G06V 20/584 |
| 2022/0109789 A1* | 4/2022 | Chee | ............... | G06T 1/0007 |
| 2022/0159172 A1* | 5/2022 | Bellessort | ............... | H04N 23/617 |
| 2022/0224880 A1* | 7/2022 | Bellessort | ............... | G06T 7/80 |
| 2022/0236625 A1* | 7/2022 | Citerin | ............... | G03B 7/28 |
| 2023/0038159 A1* | 2/2023 | Holland | ............... | H04N 23/61 |

* cited by examiner

METHOD OF CONFIGURING A CAMERA

FIELD OF INVENTION

The present disclosure relates to the comparison of, and selection between, a set of imaging profiles for a camera to provide an optimised output for a particular use case.

TECHNICAL BACKGROUND

Some digital cameras may be configured to operate according to more than one predefined imaging profile. Each imaging profile may define certain settings and algorithms that the camera uses when capturing and processing images. The imaging profiles are designed to produce video which is optimised for different use cases and scene characteristics. For example, there might be an imaging profile for traffic surveillance which is designed to produce video which is optimised for monitoring moving cars. Another profile may be designed to produce video which is optimised for face recognition. Further examples may include imaging profiles that are optimised for detecting the occurrence of certain types of objects (e.g., cars and/or people), determining the speed of moving objects, determining the illumination of objects or areas of an imaged scene, etc. Further examples may include imaging profiles that are optimised for certain scene characteristics, such as low light or high dynamic range scenes. Each imaging profile is hence designed to work well for imaging certain characteristics in the scene. A user of the camera will desire that the correct imaging profile be used for their intended scene and use case. However, it can sometimes be difficult for the user to know which profile to choose.

SUMMARY

A first aspect of the disclosure is a method of configuring a camera, the method comprising: collecting a video data with the camera, providing a plurality of imaging profiles, each imaging profile being associated with a set of scene characteristics, for each imaging profile, generating spatial output data in dependence on the video data and the set of scene characteristics of the imaging profile, wherein the spatial output data is indicative of spatial locations of events detected in the video data matching one or more of the scene characteristics, performing a comparison of the spatial output data of each of the plurality of imaging profiles, selecting a preferred imaging profile in dependence on the comparison, configuring the camera to operate according to the preferred imaging profile. This advantageously allows a camera to be tested in a scene against a particular use case with a variety of different configurations, and then configured to operate according to the best configuration selected either automatically or by a user. This allows setup and optimisation of the operation of a camera system to be performed much more efficiently.

Optionally, the scene characteristics may comprise object types. The scene characteristics may optionally comprise at least one of an object velocity, an object size, an object position, an object colour, an object type, an object temporal behaviour, and an object's relationship to another object. The scene characteristics may comprise one or more illumination levels. The use of different scene characteristics advantageously allows the imaging profiles to be optimised for different possible use cases and therefore provide a user with a number of choices to select from.

The comparison of the set of spatial output data of each of the plurality of imaging profiles may optionally comprise a comparison of the spatial locations and/or frequencies of events detected in the video data for each of the plurality of imaging profiles. A spatial and frequency-based comparison advantageously allows both location and time to be used as factors in comparing and contrasting the imaging profiles. The comparison of the spatial output data for each of the plurality of imaging profiles may further comprise a determination of the imaging profile with a highest frequency of detected events having spatial locations within a spatial region. This advantageously allows a relatively simple metric by which to measure the respective imaging profiles. The comparison may further comprise receiving a user input being indicative of the spatial region. This advantageously allows a user to indicate their user specific criteria by which the imaging profiles can be compared.

The spatial output data may optionally be defined according to a map corresponding to the video data and may comprise one or more locations on the map corresponding to spatial locations of events in the video data, and wherein the spatial region is defined according to the map. The spatial region may further comprise at least one of a position on the map within a defined boundary, a position on the map within a range of a point, or a position on the map within a range of a line. The spatial region may advantageously allow a comparison of imaging profiles on a region of the video data where the results of the different imaging profiles are of particular importance.

The selection of a preferred imaging profile may be carried out automatically in dependence on the comparison of the spatial output data. This may advantageously allow automation of imaging profile selection with little or no input from a human.

The comparison of the spatial output data of each of the plurality of imaging profiles and selection of a preferred imaging profile may optionally include displaying the spatial output data of each imaging profile and receiving a user input being indicative of the preferred imaging profile. This advantageously allows a user to select the optimal imaging profile for their desired use case. The spatial output data of each imaging profile may be displayed as a heat map. The use of a heatmap may advantageously allow a user to quickly identify areas in the scene where there are hotspots of events corresponding to the scene characteristics of the respective imaging profile.

An imaging profile may comprise a camera configuration and wherein operating the camera according to an imaging profile comprises operating the camera according to the camera configuration. An imaging profile may comprise an image processing algorithm configured to detect events in a video data matching one or more of the scene characteristics, and operating the camera according to an imaging profile comprises operating the image processing algorithm of the imaging profile on the video data. This advantageously allows the imaging profile to further define how the video data is processed, allowing a greater variety in possible imaging profile use cases.

A second aspect of the present disclosure provides an imaging system comprising: a camera being configured to collect a video data of a scene comprising a set of objects, a set of imaging profiles, each imaging profile associated with a set of scene characteristics, a processing unit configured to, for each imaging profile, generate a set of spatial output data in dependence on the video data and the set of scene characteristics of the imaging profile, wherein the spatial output data is indicative of spatial locations of events detected in the video data matching one or more of the scene characteristics, the imaging system being configured to operate the camera according to a preferred imaging profile of the set of imaging profiles, wherein the preferred imaging profile is determined in dependence on a comparison of the sets of spatial output data of the imaging profiles.

BRIEF DESCRIPTION OF THE DRAWINGS

Other features and advantages will become apparent from the following detailed description of an example, with reference to the accompanying drawings, in which.

DETAILED DESCRIPTION

Figure 1:
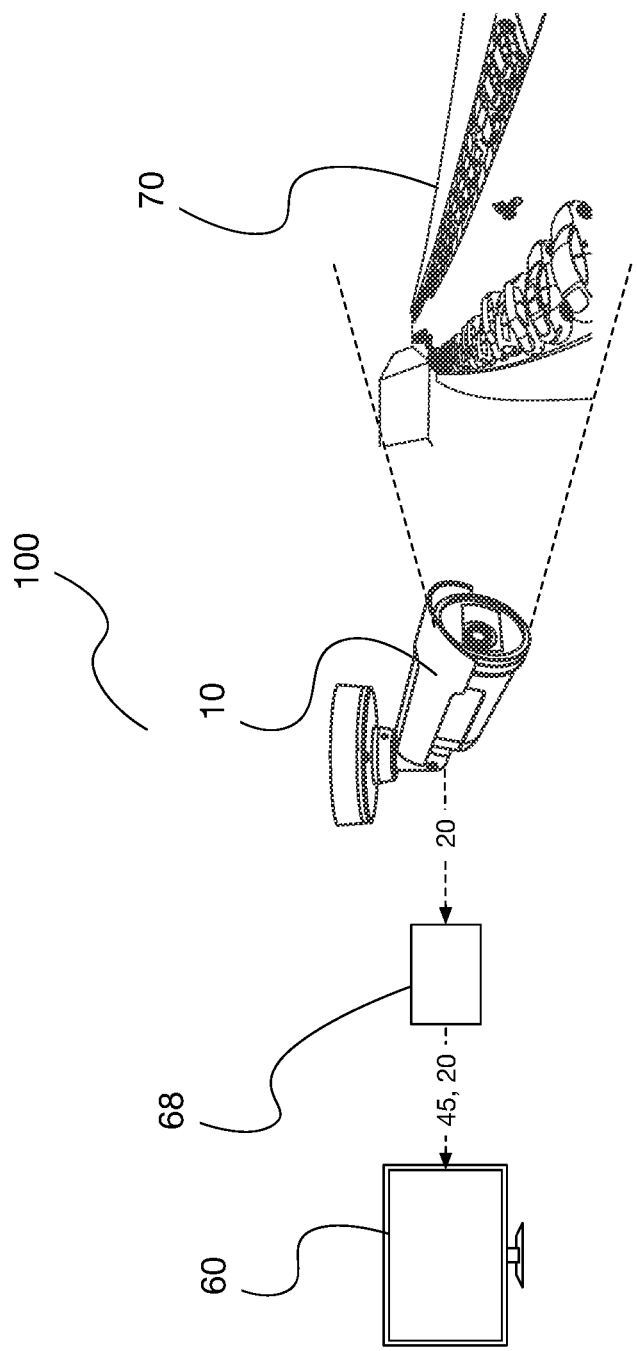
FIG. 1 is a diagram of an example of imaging system 100.

The present description relates to apparatuses and techniques for providing improved optimised comparison and selection of imaging profiles for use with a camera. Throughout the description, the same reference numerals are used to identify corresponding elements.

An imaging system 100, as shown in FIG. 1, includes a camera 10 monitoring a scene 70. Camera 10 is connected to post processing unit 68 and post processing unit 68 is connected to Video Management System (VMS) 60 over a link comprising a direct connection, a network, or an internet connection.

Figure 2A:
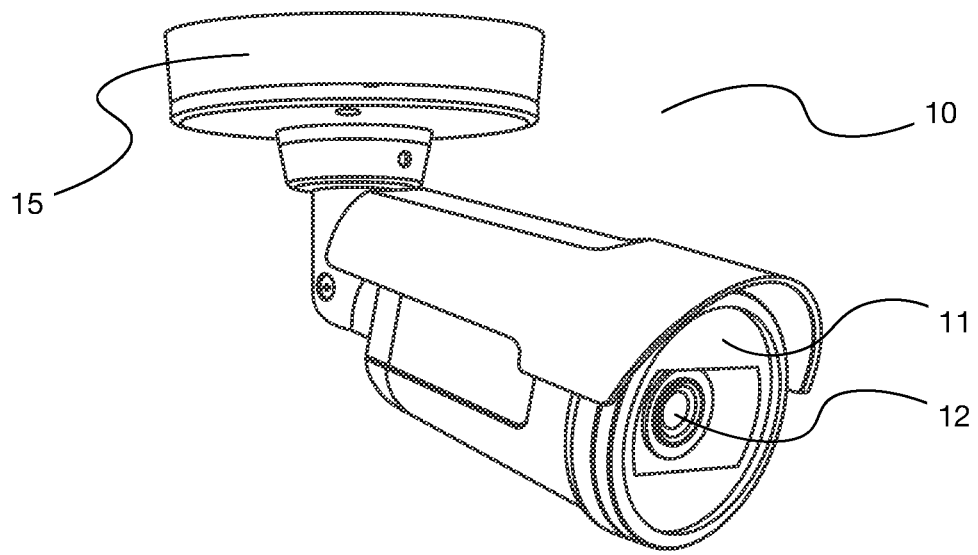
FIG. 2A is a diagram of an example of camera 10.

As illustrated in FIG. 2A, the camera 10 may comprise an imaging sensor 12, arranged to capture video of the monitored scene 70, an optical arrangement 11 arranged to direct and filter light from the scene 70 to the imaging sensor 12, and a processing unit 15, configured to perform various video processing activities, optionally including performing processing of the hue, saturation, and brightness of the captured video stream, and encoding the captured video stream in an appropriate format. An output video data 20 of the camera 10 is transmitted, directly or indirectly, to VMS 60, and is viewed by a user of the VMS 60 on a display of the VMS 60.

Post processing unit 68 is configured to receive video data 20 from camera 10 and carry out processing of video data 20 to generate a spatial output data 45. Post processing unit 68 may be located at the camera, at VMS 60, or at another location, such as between camera 10 and VMS 60. Spatial output data 45 may then be transmitted to VMS 60 for viewing by a user. The post processing unit 68 has been described above as a single unit but may be configured as separate controllers or modules. The separate controllers or modules can be specialized controllers for e.g., processing the videos and images, or general controllers or modules that can control more than one component. The post processing unit 68, or the specialized modules or controllers, may be at least partially implemented by software executed by a central processing unit (CPU). In an example, a computer program product comprising instructions which, when the program is executed by a computer, cause the computer to carry out steps as discussed above in relation to the post processing unit 68. The post processing unit 68 may be implemented by special-purpose software (or firmware) run on one or more general-purpose or special-purpose computing devices. The processing unit may include one or more processing units, e.g., a CPU ("Central Processing Unit"), a GPU ("Graphics Processing Unit"), an AI accelerator chip, a DSP ("Digital Signal Processor"), an ASIC ("Application-Specific Integrated Circuit"), a scaler, a DDIC (display driver integrated circuit), discrete analogue and/or digital components, or some other programmable logical device, such as an FPGA ("Field Programmable Gate Array"). The processing unit may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and associated control parameter values may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The processing unit may include one or more communication interfaces, such as a serial interface, a parallel interface, a USB interface, a wireless interface, a network adapter, etc., as well as one or more data acquisition devices, such as an A/D converter. The special-purpose software may be provided to the processing unit on any suitable computer-readable medium, including a record medium, and a read-only memory.

A desired end result of imaging system 100 is an image displayed on VMS 60 that provides the most useful and relevant information to a user of the VMS. The type of information that may be useful and relevant to the user is dependent on the user's intended use case for the imaging system 100. It is therefore desirable to configure the camera 10 such that it delivers video which is optimal for a portion of the scene and situations that the user has in mind. To assist the user in configuring the camera 10, there may be a plurality of predefined imaging profiles, each defining a camera configuration, to choose between. Each imaging profile is designed to cause the camera to produce video which is optimized for certain characteristics in the scene, which in turn may be related to different use case. By way of example, there may be an imaging profile which is designed to provide video which is optimized for traffic surveillance purposes and another imaging profile which provides video which is optimized for face recognition purposes. Each imaging profile is hence designed to provide video which is optimized with respect to certain characteristics in the scene, such as a certain type of object, a certain speed of moving objects, or a certain illumination level in the scene.

Figure 2B:
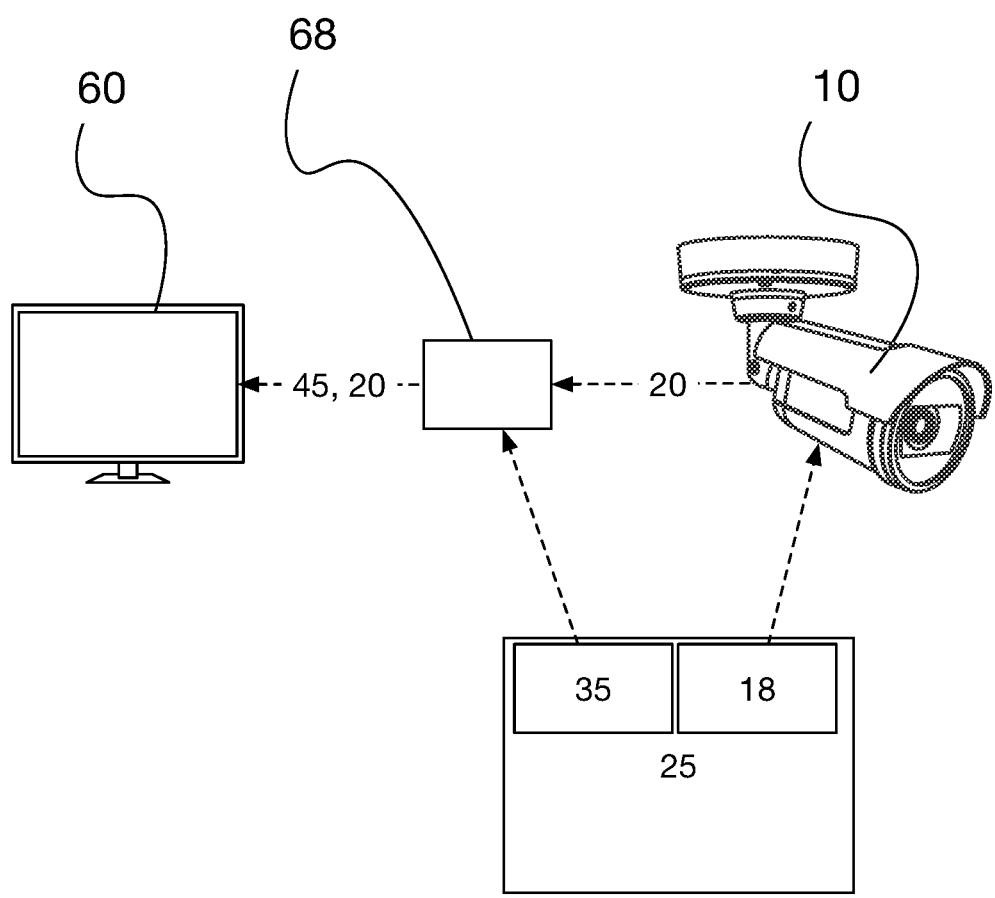
FIG. 2B is a diagram of an example imaging profile 25.

In an example shown in FIG. 2B, an imaging profile 25 is associated with a camera configuration 18 and a set 35 of scene characteristics. The set 35 of scene characteristics defines characteristics in the scene with respect to which the imaging profile 25 is optimized. As further exemplified below, this could be an object type, a characteristic of an object, or an illumination level. Thus, if the camera 10 is operated according to the camera configuration 18 of the imaging profile 25 it will produce video which is optimized for the set 35 of scene characteristics of the imaging profile 25.

The camera configuration 18 may include one or more settings for the optical arrangement 11 and/or the imaging sensor 12. In one example, where an imaging profile 25 for traffic surveillance is intended to be used for monitoring moving cars (i.e., where the scene characteristics 75 associated with the imaging profile 25 are moving vehicles), the camera configuration 18 will comprise settings for the optical arrangement 11, imaging sensor 12, and/or processing unit 15, that provides the best results for monitoring moving cars. For example, these may include a wide depth of field, a short exposure time, and a high imaging frame rate. The camera configuration 18 may further comprise one or more settings for processing unit 15 of camera 10. The settings of the camera configuration 18 may be optimised for producing results for an intended use of the corresponding imaging profile 25. In an example, processing unit 15 may be provided with a camera image processing algorithm optimised to minimise blur or other video artifacts resulting from fast moving objects in scene 70. In an example, where a user is interested in traffic monitoring or monitoring of other fast-moving objects, a spatiotemporal noise filter configured for minimal motion blur may be employed in processing unit 15. In one example, the camera configuration 18 may include configuration options for selecting a spatiotemporal noise filter provided with processing unit 15. In another example, camera configuration 18 may include the spatiotemporal noise filter code for execution by the processing unit 15. Spatiotemporal noise filters per se are known in the art. In another example, where facial recognition is a primary objective of the use case, camera configuration 18 may include settings for processing unit 15 to enable for high dynamic range images of the scene to be generated, allowing contrast in darker areas of the image to be enhanced and making facial features more pronounced and easier to recognise. Methods of enabling generation of high dynamic range images are known in the art.

Figure 3:
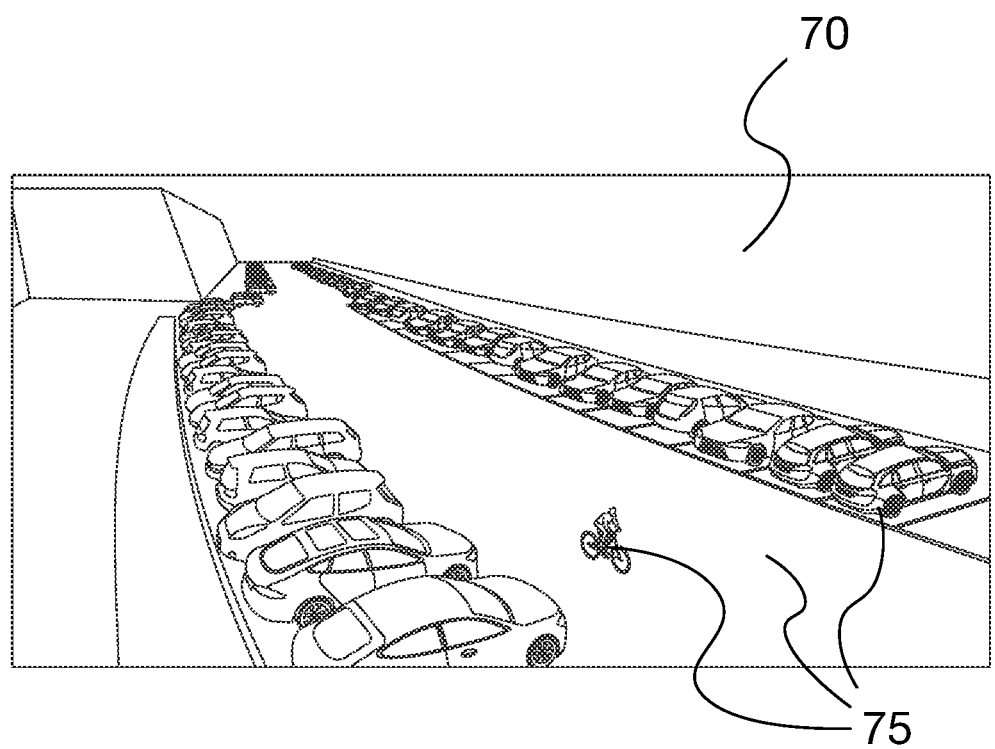
FIG. 3 is a diagram of an example scene 70 imaged by the camera 10.

FIG. 3 shows a scene 70 imaged by imaging system 100. Scene 70 may comprise various scene characteristics 75, including objects. Scene characteristics 75 that are objects may comprise fixed objects including roads, foot paths, parking spaces, traffic lights, etc. Scene characteristics 75 may further comprise non-fixed objects such as cars, trucks, cyclists, pedestrians, animals, cargo containers, etc.

The scene characteristics 75 may optionally also comprise characteristics of the imaged objects. For example, scene characteristics 75 may comprise at least one of an object velocity, an object size, an object position, an object colour, an object type, an object temporal behaviour, and an object's relationship to another object. The scene characteristics 75 may comprise one or more illumination levels.

Figure 4:
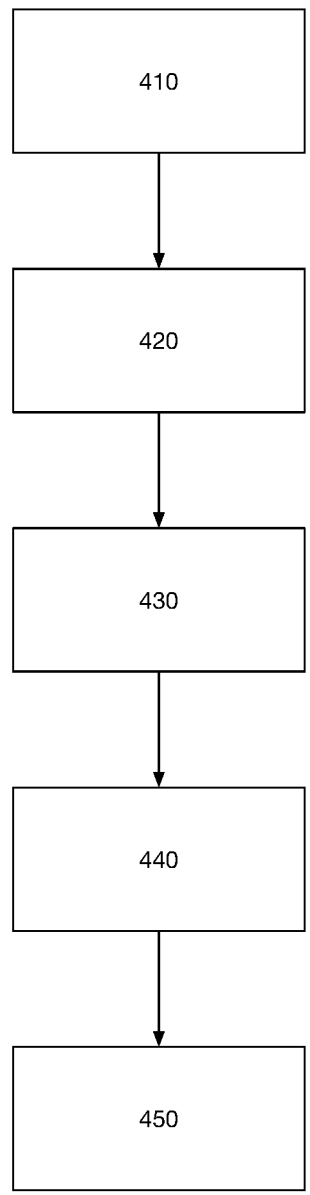
FIG. 4 is a flowchart of an example operation of camera 10.

FIG. 4 is a flowchart of an example operation of imaging system 100. In step 410, an imaging profile 25 associated with a set 35 of scene characteristics 75 is provided.

In step 420, video data 20 is collected by camera 10 using a first camera configuration. The video data 20 may be collected during a limited time period, for example in connection to installing the camera 10 in a new scene, or may be collected continuously. The first camera configuration may be a default configuration used by the camera to collect data when no other configuration is defined by a user. Alternatively, the first camera configuration may be provided by the imaging profile 25. Alternatively, the first camera configuration may be provided by a user. In cases where the first camera configuration is not the same as the camera configuration of the imaging profile 25, the captured video data 20 may further be modified, using image processing, to make it look as if it were captured using the camera configuration of the imaging profile 25, or at least more similar to what it would have looked like had it been captured using the camera configuration of the imaging profile 25. In this way, one can hence emulate that the camera configuration of the imaging profile 25 was used when capturing the video data 20. In this regard, it is noted that some of the settings of the camera configuration of the imaging profile 25 are easier to emulate than others. Specifically, the settings for the processing unit 15 of the camera 10 are typically easier to emulate than the settings for the optical arrangement 11 and/or imaging sensor 12. The emulation may therefore be limited to the one or more settings of the processing unit 15 of the camera 10. Accordingly, the video data 20 may be modified to look as if they were processed by the one or more settings of the processing unit 15 associated with the camera configuration of the imaging profile 25 instead of those of the first camera configuration.

In step 430, video data 20 is transmitted to post processing unit 68.

In step 440, using post processing unit 68, a spatial output data 45 is generated from video data 20 indicative of spatial locations of events detected in the video data 20, where each event matches one or more of the scene characteristics 75 in the set 35 of scene characteristics associated with the imaging profile 25.

In more detail, the post processing unit 68 may detect events in the video data 20. The type of events to be detected is specified by the set of scene characteristics 35 associated with the imaging profile 25. Specifically, events in the video data 20 that match, i.e., correspond to the set 35 of scene characteristics 75 of the imaging profile are detected. By way of example, if the imaging profile 25 is associated with a scene characteristic 75 which is a certain type of object, such as cars or faces, the post processing unit 68 may detect occurrences of that certain type of object in the video data 20. If the imaging profile 25 is associated with a scene characteristic which is a certain characteristic of an object, such as a certain object speed, the post processing unit 68 may detect occurrences of objects having that certain object characteristics. If the imaging profile 25 is associated with a scene characteristic which is a certain illumination level, the post processing unit 68 may detect occurrence of that illumination level in the video data 20. If the imaging profile 25 is associated with more than one scene characteristic, it is understood that the scene characteristics may be combined such that events in the scene that match all of the scene characteristics are detected in the video data 20. Alternatively, the scene characteristics associated with the imaging profile 25 may be treated separately such that events in the scene which match any one of the scene characteristics are detected in the video data 20.

The way in which the post processing unit 68 detects events are per se known in the art. For example, it may use known object detection algorithms, motion detection algorithms, or illumination detection algorithms for that purpose. The post processing unit 68 may select which algorithm to apply depending on the set 35 of scene characteristics 75 of the imaging profile 25 under evaluation. Thus, the set 35 of scene characteristics of the imaging profile 25 may be said to be associated with an image processing algorithm suitable for detecting events that match one or more of the scene characteristics 75 associated with the imaging profile 25. In one example, the image processing algorithm comprises a neural network. The neural network may, for example, be configured to locate faces in scene 70 and record their characteristics in case the set 35 of scene characteristics includes the object type "faces" and/or object characteristics relating to faces. Alternatively, algorithms including Histogram of oriented gradients (HOG) or Eigenface may be employed for detection of faces.

In another example, where an imaging profile 25 for traffic surveillance is intended to be used for monitoring moving cars, the post processing unit 68 may use an image processing algorithm optimised to detect velocity and other characteristics of moving vehicles. Alternatively, a temporal noise filter may be employed on processing unit 15 and configured for temporal filtering. The temporal noise filter may be used to detect motion in the video data 20. This detected motion may be used to generate an estimate of the amount of motion in the scene. In another example, the brightness of the imaged scene may be determined by an exposure algorithm, using a current exposure setting of the imaging sensor 12 in combination with a histogram of the imaged scene, to estimate the brightness/dynamic range of the scene. Suitable exposure algorithms are known in the art.

The post-processing 68 may further record the spatial location of the detected events in the video data 20 to produce a data set, referred to herein as spatial output data 45, which is indicative of the spatial locations of the detected events. For example, the spatial output data 45 may include the spatial location of each detected event. The spatial output data 45 may provide a set of data that records the occurrence of events in the video data 20 on a frame by frame basis. Each frame may comprise a list of events and their respective spatial location in the frame.

The spatial output data 45 may further be indicative of a frequency of occurrence of events. This may include, for example, the total frequency of events over the length of the video of video data 20, the frequency of events in a spatial sub portion of video data 20, the frequency of events in a spatial sub portion of the video data 20 relative to the normalised frequency of events across the whole of video data 20, etc. The spatial output data 45 may hence reflect how the occurrence of detected events are spatially distributed in the video data 20. For example, the spatial output data 45 may be in the form of a histogram which indicates the frequency of events (optionally normalized with respect to the total number of detected events) that are detected in different spatial sub portions of the video data 20. In one example, the spatial output data 45 may be defined according to a map corresponding to the video data 20 and may comprise one or more locations on the map corresponding to spatial locations of events in the video data 20. The map may be a 2D map corresponding to the resolution and size of the video data 20 and a location on the map may be defined according to x and y co-ordinates. For example, each event may be determined according to an x and y co-ordinate in the map (perhaps correlating to the x and y pixel coordinate of the video data 20). In another example, the map may be a 3D map of scene 70 and spatial output data 45 comprises depth information indicative of the position of the event in the 3D space of scene 70. The spatial output data 45 may further be temporally resolved to indicate when in time each event was detected. For example, the spatial output data 45 for the plurality of imaging profiles 25 may be shown along a timeline with the with events for various imaging profiles 25 marked along the time axis. That way a user could get a better sense of during which times various profiles are best suited.

In addition to the spatial output data 45, the post processing unit 68 may collect one or more example images from the video data 20 that show situations where the imaging profile 25 under evaluation would be a good choice or a bad choice. In one example, an imaging profile 25 may be considered a good choice during time periods with a high occurrence of events that match the set 35 of scene characteristics 75 of the imaging profile 25. The post processing unit 68 may hence collect an example image captured during a time period where the frequency of matching events exceeds a first threshold. Conversely, an imaging profile 25 may be considered a bad choice during time periods with a low occurrence of events that match the set 35 of scene characteristics 75 of the imaging profile 25. The post processing unit 68 may hence collect an example image captured during a time period where the frequency of matching events is below a second, lower, threshold. In another example, the imaging profile 25 may be considered a good choice in spatial regions where the spatial output data 45 indicates a high frequency of detected events, such as spatial regions where the frequency of detected events exceeds a first threshold. Conversely, the imaging profile 25 may be a bad choice in spatial regions where the spatial output data 45 indicates a low frequency of detected events, such as spatial regions where the frequency of detected events is below a second, lower, threshold. The post processing unit 68 may collect an example image depicting a situation where there is activity in a spatial region which according to the spatial output data 45 has a high frequency of detected events. For example, say that a high frequency of events was detected in a spatial region corresponding to a road in the scene 70. Then the example image may depict a situation where a car drives on the road. The so collected example image hence shows a situation in the scene 70 for which the imaging profile 25 would be a good choice. Additionally, or alternatively, the post processing unit 68 may collect an example image depicting a situation where there is activity in a spatial region which according to the spatial output data 45 has a low frequency of detected events. For example, say that a low frequency of events was detected in a spatial region corresponding to a foot path in the scene 70. Then the example image may depict a situation where a person walks on the foot path. The so collected example image hence shows a situation where the imaging profile 25 would be a less good choice. The one or more example images may comprise a cropped image or a collage of cropped images of the spatial region in question. The example images may be shown to the user and hence allows the user to get a picture of situations in the scene 70 for which the imaging profile 25 would be a good choice or a bad choice. Depending on what type of situations in the scene 70 the user intends to monitor, this assists the user in choosing whether to configure the camera 10 according to the imaging profile or not.

In step 450, the spatial output data 45 is transmitted to VMS 60 and displayed on VMS 60. The spatial output data 45 may be displayed in the form of a heat map corresponding to the x and y co-ordinates of all events in video data 20, where different colours ("temperatures") are used to indicate the frequency of detected events in different spatial sub-portions of the scene.

Figure 5A:
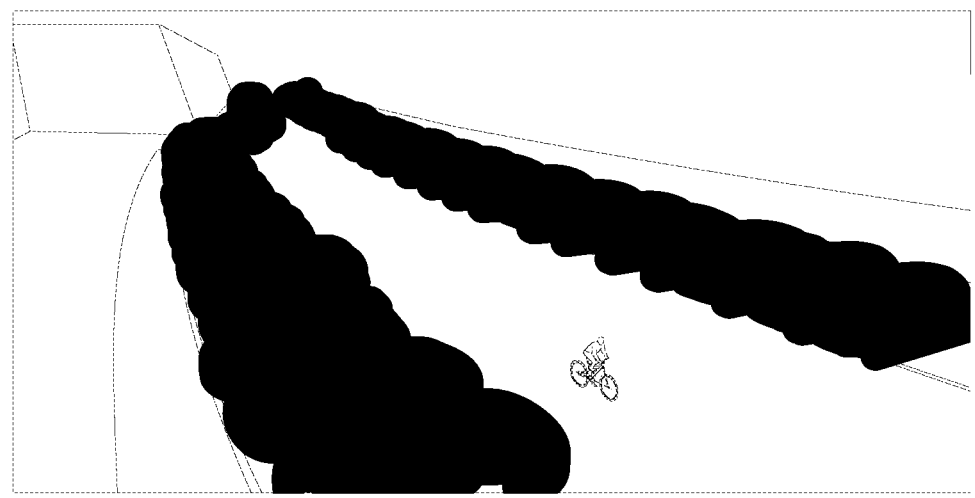
FIG. 5A is a diagram of an output of VMS 60.

FIG. 5A depicts an example of an output display of the VMS 60 showing a spatial output data 45 generated from scene 70 shown in FIG. 3. In the example of FIG. 5A, an imaging profile 25 suitable for detecting parked cars is evaluated (i.e., where the scene characteristics 75 associated with the imaging profile 25 are vehicles having zero velocity). In this configuration, the post processing unit 68 includes a neural network, or another suitable algorithm, configured to locate vehicles having zero velocity in video data 20. In the example of FIG. 5A, parked cars are detected in video data 20 by the neural network and a spatial output data 45 is generated, comprising locations of parked cars in the video data 20.

The resulting spatial output data 45 is presented to a user in the form of a heatmap showing the presence of vehicles having zero velocity within video data 20. The use of a heatmap may advantageously allow a user to quickly identify hotspots of events corresponding to the scene characteristics of the respective imaging profile. This advantageously allows users to deduce which areas of current scene the imaging profile 25 is expected to work well for.

Figure 5B:
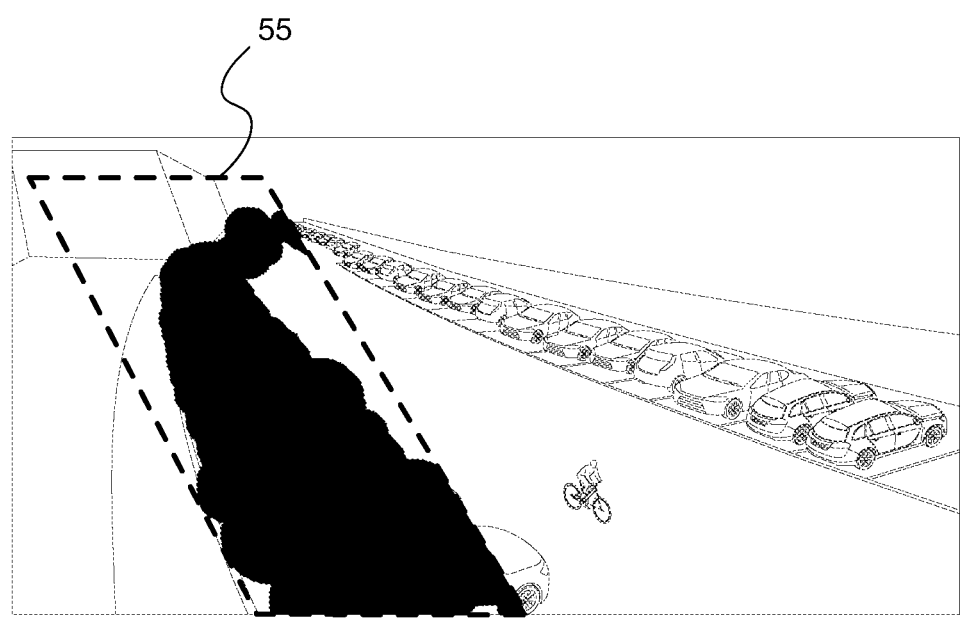
FIG. 5B is a diagram of an output of VMS 60 where a spatial region 55 has been applied.

In one example of the disclosure where the spatial output data 45 is defined according to a map, a spatial region 55 is defined programmatically, or directly by a user, with respect to the map. The spatial region 55 may comprise at least one of: a region of the map within a defined boundary; a region of the map within a range of a point; or a region of the map within a range of a line. In an example shown in FIG. 5B, the VMS 60 may then be configured to restrict the heatmap to the spatial region 55. Spatial region 55 may advantageously allow a user to focus a comparison of imaging profiles 25 (as described below) on a region of the video data 20 where the results of the different imaging profiles 25 are of particular importance. In the example shown in FIG. 5B, where a user is interested in vehicles parked on one side of the street, a spatial region 55 may be selected to exclude the other side of the street. In another example, a user may be interested in monitoring people and cars on a parking lot, but not the cars on the road outside the parking lot. In this example, the user may select the region of interest to be the parking lot.

Figure 6:
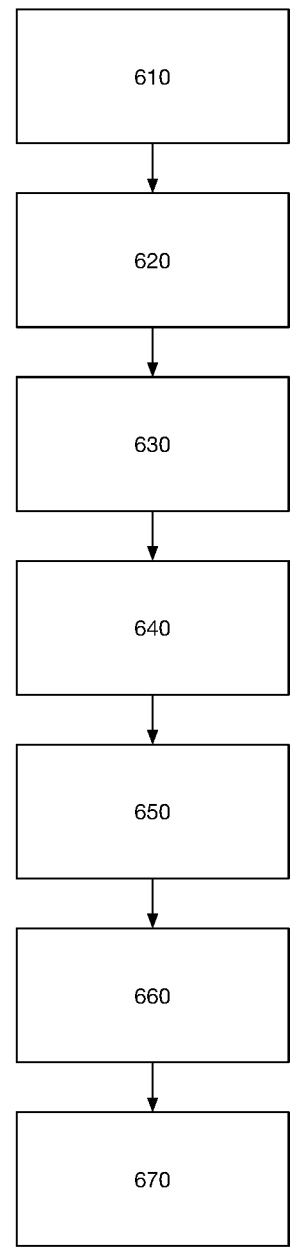
FIG. 6 is a flowchart of another example operation of camera 10.

FIG. 6 is a flowchart of another example operation of imaging system 100.

In step 610, a plurality of imaging profiles 25, each associated with a different set 35 of scene characteristics 75, is provided.

In step 620, video data 20 of scene 70 is collected by camera 10 using a first camera configuration. As explained above, the video data 20 may be collected during a limited period of time or continuously. What was said about the first camera configuration above in connection to step 420 applies to step 620 as well. The first camera configuration may be a default configuration used by the camera to collect data when no other configuration is defined by a user. Alternatively, for each imaging profile 25, the first camera configuration may be provided by that imaging profile 25. Alternatively, the first camera configuration may be provided by a user. As described above, in cases where the first camera configuration is not the same as the camera configuration of the imaging profile 25, the captured video data 20 may further be modified, using image processing, to make it look as if it were captured using the camera configuration of the imaging profile 25, or at least more similar to what it would have looked like had it been captured using the camera configuration of the imaging profile 25.

In step 630, the video data 20 is transmitted to post processing unit 68.

In step 640, using post processing unit 68, a spatial output data 45 is generated for each of the plurality of imaging profiles 25 from video data 20, each spatial output data 45 indicative of spatial locations of events detected in the video data 20 matching one or more of the scene characteristics 75 for the respective imaging profile 25. The spatial output data 45 of each of the plurality of imaging profiles 25 may be generated using the methods described in step 440. The post processing unit 68 may also collect one or more example images for each of the imaging profiles 25 as explained above.

In step 650, a comparison of the spatial output data 45 of each of the plurality of imaging profiles 25 is performed. In one example of the disclosure, the comparison of the set of spatial output data of each of the plurality of imaging profiles comprises a comparison of the spatial locations and/or frequencies of events detected in the video data 20 for each of the plurality of imaging profiles 25.

In one example, the post processing unit 68 compares the frequency of detected events for different imaging profiles within a spatial region 55 in the scene. To facilitate the comparison, the frequency of detected events may be a normalized frequency so that a percentage of events occurring within a spatial region 55 can be determined for each imaging profile 25. The spatial region 55 may be provided via user input, e.g., via the VMS 60. The spatial region 55 may be a region in the scene that is of particular interest to the user. The user would hence like to find an imaging profile 25 which is optimized to give a good quality in that region in the scene 55.

In step 660, a preferred imaging profile from the plurality of imaging profiles 25 is selected in dependence on the comparison of the spatial output data 45 of the plurality of imaging profiles 25. In one example of the disclosure, the selection of a preferred imaging profile may be carried out automatically in dependence on the comparison of the spatial output data 45. For example, the imaging profile 25 having a highest normalized frequency of detected events within the spatial region 55 may be selected.

In an alternative example of the disclosure, the comparison of the spatial output data 45 of each of the plurality of imaging profiles and selection of a preferred imaging profile comprises displaying the spatial output data of each imaging profile and receiving a user input being indicative of the preferred imaging profile. In addition to the spatial output data 45, example images that show situations where each imaging profile 25 would be a good choice or a bad choice may be displayed. Displaying of spatial output data 45 and any example images of each imaging profile 25 may be performed using a display of the VMS 60 and receiving user input being indicative of the preferred imaging profile may be done using a user interface of VMS 60. As explained above, the spatial output data 45 of each imaging profile may be displayed as a heat map, where the temperatures in the heat map are indicative of the frequency of detected events in different spatial areas of the scene 70. When presented with the heat map of each imaging profile 25, the user can deduce which areas in the scene would benefit from using which imaging profile 25. Specifically, an imaging profile 25 with a higher normalized frequency of detected events (as represented by a higher temperature in the heat map) in a certain spatial area may be expected to provide more optimized video in that spatial area than an imaging profile 25 having a lower normalized frequency of detected events in the same spatial area. Accordingly, by comparing the heat maps, the user is enabled to select an imaging profile 25 which is expected to give the best result for a region of particular interest to the user.

In some examples, the spatial output data 45 of the plurality of imaging profiles are displayed to the user in different pictures. In other examples, the spatial output data 45 is displayed to the user in the same picture. For example, different colours or patterns may be used to illustrate spatial output data 45 of different imaging profiles. For example, a first colour may be used to indicate spatial regions where the normalized frequency of detected events of a first imaging profile exceeds a threshold, and a second colour may be used to indicate spatial regions where the normalized frequency of detected events of a second imaging profile exceeds the threshold. In that way, the user may from a single picture get an overview of which imaging profiles are beneficial in different spatial regions of the scene.

In step 670, the camera 10 is configured to operate according to the preferred imaging profile. In particular, the camera 10 may be configured to operate according to the camera configuration 18 of the preferred imaging profile. Camera 10 may be configured to continue to operate according to the camera configuration 18 of the preferred imaging profile until another camera configuration is provided. i.e., camera 10 may be configured to adopt camera configuration 18 as a default configuration.

In a first example use case of the above example operation of imaging system 100, a user is able to compare a set of different imaging profiles 25, each imaging profile being associated with different sets 35 of scene characteristics 75, and select a preferred imaging profile that most closely suits their needs. In step 610, a set of imaging profiles 25 are provided that represent the most common use cases of imaging system 100. i.e., the set of imaging profiles 25 are associated with sets 35 of scene characteristics 75 that are most typically monitored by users of imaging system 100. In this example, one imaging profile is associated with faces, one imaging profile is associated with parked vehicles, and one imaging profile is associated with moving vehicles. In step 620, video data 20 of scene 70 is collected by camera 10 using a default camera configuration. In steps 630 and 640, the video data 20 is processed by post processing unit 68 to generate a set of spatial output data 45, corresponding to the spatial locations of faces, parked vehicles, and moving vehicles, respectively. In step 650, video data 20 is displayed on VMS 60 with an overlay showing spatial output data 45. The spatial output data 45 is provided in the form of a heat map, showing the frequency of the occurrence of faces, parked vehicles, and moving vehicles respectively at the corresponding position in video data 20. Optionally, the user of VMS 60 may choose to define a spatial region 55 using the interface of VMS 60 comprising a spatial sub-portion of video data 20. Once the spatial region 55 is selected, VMS 60 only displays the spatial output data 45 within the spatial region 55, allowing the user to focus on a spatial sub-portion of video data 20. The user cycles through each of the imaging profiles 25 and the view of the corresponding spatial output data 45, until they decide on the most useful result for their intended use case. The user may then select an imaging profile 25 as their preferred imaging profile. Alternatively, the post processing unit 68 may automatically determine the spatial output data 45 with the highest frequency of detected events within the spatial region 55 and select the corresponding imaging profile as the preferred imaging profile. In this example, the imaging profile 25 associated with moving vehicles is selected. In step 660, the camera 10 is configured to continue operation using camera configuration 18 of the preferred imaging profile. Imaging system 100 then continues to provide video data 20 to VMS 60 with no further configuration required.

In a second example use case of the above example operation of imaging system 100, a user is able to compare a set of different imaging profiles 25, each imaging profile being associated with a similar scene characteristic 75. In an example of this use case, the imaging profiles 25 may be all designed to facilitate detection of faces in video data 20, but comprise different approaches and different algorithms suitable for different circumstances. By operating imaging system 100 according to this example use case, the user is able to determine the most suitable imaging profile 25 for monitoring the number of faces over time in scene 70. In step 610 of this example, a set of imaging profiles 25 are provided that are optimized with respect to different methods of detecting faces in scene 70, one optimised for detection of faces in low light, one optimised for detection of faces in daylight, and one optimised for detection of partially obscured faces. The respective sets of scene characteristics in this case are hence, faces in low light, faces in daylight, and obscured faces. In one example where a user desires to monitor faces inside of a building, the faces in low light are determined to be inside the building, and therefore of interest, while the faces in daylight are determined to be outside the building (e.g., faces imaged through a window on the sidewalk outside in direct daylight), and therefore of less interest to the user. In step 620, video data 20 of scene 70 is collected by camera 10 over a time period which preferably is long enough to reflect the variability in lighting conditions in the scene using a default camera configuration. In steps 630 and 640, the video data 20 is processed by post processing unit 68 to detect events matching the scene characteristics of each of the imaging profiles 25. That is, for the first imaging profile the occurrence of faces in low light conditions is detected, for the second imaging profile the occurrence of faces in daylight conditions are detected, and for the third imaging profile the occurrence of obscured faces is detected. For each imaging profile 25, a set of spatial output data 45 is generated, corresponding to the spatial locations of the detected events. In step 650, video data 20 is displayed on VMS 60 with an overlay showing spatial output data 45. The spatial output data 45 is provided in the form of a heat map, showing the frequency of the occurrence faces according to each imaging profile. The user of VMS 60 may choose to define a spatial region 55 using the interface of VMS 60 comprising a sub-portion of video data 20. In this example, the user selects a region corresponding to a foot path, in order to exclude a nearby advertisement video display that occasionally displays faces. Once the spatial region 55 is selected, VMS 60 only displays the spatial output data 45 within the spatial region 55, allowing the user to focus on the foot path shown in video data 20. The user cycles through each of the imaging profiles 25 and the view of the corresponding spatial output data 45, until they decide on the imaging profile 25 for which a highest frequency of events was detected in the spatial region 55. The user may then select an imaging profile 25 as their preferred imaging profile. Alternatively, the user may specify an optimisation criteria, e.g., the highest number of detected events within the spatial region 55, and the imaging system 100 may automatically determine the spatial output data 45 with the highest frequency of detected events within the area of the foot path and select the corresponding imaging profile as the preferred imaging profile. In step 660, the camera 10 is configured to continue operation using camera configuration 18 of the preferred imaging profile. Imaging system 100 then continues to provide video data 20 to VMS 60 with no further configuration required.

The invention claimed is:

1. A method of configuring a camera, the method comprising:
   providing a plurality of imaging profiles, each imaging profile being associated with a set of scene characteristics and comprising a camera configuration,
   for each imaging profile,
   collecting video data with the camera using the camera configuration of the imaging profile or by using another camera configuration and then modifying the video data to emulate that it was captured using the camera configuration of the imaging profile, and
   generating a spatial output data in dependence on the video data and the set of scene characteristics of the imaging profile, wherein the spatial output data is indicative of spatial locations of events detected in the video data matching one or more of the scene characteristics,
   performing a comparison of the spatial output data of each of the plurality of imaging profiles including a comparison of the spatial locations and/or frequencies of events detected in the video data for each of the plurality of imaging profiles,
   selecting a preferred imaging profile in dependence on the comparison, and
   configuring the camera to operate according to the preferred imaging profile including the camera configuration.

2. The method of claim 1, wherein the scene characteristics comprise object types.

3. The method of claim 1, wherein the scene characteristics comprise at least one of an object velocity, an object size, an object position, an object colour, an object type, an object temporal behaviour, and an object's relationship to another object.

4. The method of claim 1, wherein the scene characteristics comprise at least one illumination level.

5. The method of claim 1, wherein the comparison of the spatial output data for each of the plurality of imaging profiles comprises a determination of the imaging profile with a highest frequency of detected events having spatial locations within a spatial region.

6. The method of claim 5, further comprising receiving a user input being indicative of the spatial region.

7. The method of claim 6, wherein the spatial output data is defined according to a map corresponding to the video data, and comprises one or more locations on the map corresponding to spatial locations of events in the video data, and wherein the spatial region is defined according to the map.

8. The method of claim 7, wherein the spatial region comprises at least one of a position on the map within a defined boundary, a position on the map within a range of a point, or a position on the map within a range of a line.

9. The method of claim 1, wherein the selection of a preferred imaging profile is carried out automatically in dependence on the comparison of the spatial output data.

10. The method of claim 1, wherein the comparison of the spatial output data of each of the plurality of imaging profiles and selection of a preferred imaging profile includes displaying the spatial output data of each imaging profile, and receiving a user input being indicative of the preferred imaging profile.

11. The method of claim 10, wherein the spatial output data of each imaging profile is displayed as a heat map.

12. The method of claim 1, wherein:
   an imaging profile comprises an image processing algorithm configured to detect events in a video data matching one or more of the scene characteristics, and
   operating the camera according to an imaging profile comprises operating the image processing algorithm of the imaging profile on the video data.

13. An imaging system comprising:
   a set of imaging profiles, each imaging profile associated with a set of scene characteristics and comprising a camera configuration,
   a camera configured to collect, for each imaging profile, a video data of a scene comprising a set of objects using the camera configuration of the imaging profile or by using another camera configuration and then modifying the video data to emulate that it was captured using the camera configuration of the imaging profile,
   a processing unit configured to, for each imaging profile, generate a set of spatial output data in dependence on the video data and the set of scene characteristics of the imaging profile, wherein the spatial output data is indicative of spatial locations of events detected in the video data matching one or more of the scene characteristics,
   the imaging system being configured to operate the camera according to a preferred imaging profile, including the camera configuration, of the set of imaging profiles,
   wherein the preferred imaging profile is determined in dependence on a comparison of the sets of spatial output data of the imaging profiles including a comparison of the spatial locations and/or frequencies of events detected in the video data for each of the plurality of imaging profiles.

14. A non-transitory computer-readable medium having instructions stored thereon which are adapted to carry out a method of configuring a camera, when executed by a device having processing capability, the method comprising:
   providing a plurality of imaging profiles, each imaging profile being associated with a set of scene characteristics and comprising a camera configuration,
   for each imaging profile,
   collecting video data with the camera using the camera configuration of the imaging profile or by using another camera configuration and then modifying the video data to emulate that it was captured using the camera configuration of the imaging profile, and
   generating a spatial output data in dependence on the video data and the set of scene characteristics of the imaging profile, wherein the spatial output data is indicative of spatial locations of events detected in the video data matching one or more of the scene characteristics,
   performing a comparison of the spatial output data of each of the plurality of imaging profiles including a comparison of the spatial locations and/or frequencies of events detected in the video data for each of the plurality of imaging profiles,
   selecting a preferred imaging profile in dependence on the comparison, and
   configuring the camera to operate according to the preferred imaging profile including the camera configuration.

* * * * *